United States Patent
Chen et al.

(10) Patent No.: US 11,250,818 B2
(45) Date of Patent: Feb. 15, 2022

(54) HEAD-UP DISPLAY DEVICE USED IN AUGMENTED REALITY

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ying-Yun Chen, Taipei (TW); Wei-Chen Lou, Taipei (TW); Rong-Seng Chang, Taipei (TW); Ming-Ping Lai, Taipei (TW); Li-Chun Pan, Taipei (TW)

(73) Assignees: UTE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 16/937,315

(22) Filed: Jul. 23, 2020

(65) Prior Publication Data
US 2021/0097962 A1 Apr. 1, 2021

(30) Foreign Application Priority Data
Sep. 26, 2019 (CN) .......................... 201910919997.3

(51) Int. Cl.
*G09G 5/38* (2006.01)
*G02B 27/01* (2006.01)
*B60K 35/00* (2006.01)

(52) U.S. Cl.
CPC .............. *G09G 5/38* (2013.01); *B60K 35/00* (2013.01); *G02B 27/0101* (2013.01);
(Continued)

(58) Field of Classification Search
CPC .. G09G 5/38; G09G 2380/10; G09G 2340/12; G09G 2340/0464; G02B 27/0179; G02B 27/0101; G02B 27/0149; G02B 2027/0154; G02B 2027/0181; G02B 2027/159; B60K 2370/23; B60K 2370/166; B60K 2370/178; B60K 2370/167; B60K 2370/177; B60K 2370/1529; B60K 35/00; G60K 2370/23; G60K 2370/166; G60K 2370/178; G60K 2370/167; G60K 2370/177; G60K 2370/1529; G60K 35/00
See application file for complete search history.

(56) References Cited

U.S. PATENT DOCUMENTS

2016/0121895 A1* 5/2016 Seo ..................... B60W 50/14
                                                       701/70
2016/0366380 A1* 12/2016 Okamoto ............. H04N 9/3161
(Continued)

*Primary Examiner* — Brent D Castiaux
(74) *Attorney, Agent, or Firm* — Innovation Counsel LLP

(57) ABSTRACT

A head-up display device used in augmented reality is provided. The head-up display device includes a set of reflectors, a first optical module and a reflector adjustment mechanism. The set of reflectors includes at least one moveable reflector. The first optical module is configured to project a first image to at least one moveable reflector and to further project the first image to a target position through the set of reflectors. The reflector adjustment mechanism is configured to adjust the position of at least one moveable reflector to change the height of the target position.

10 Claims, 6 Drawing Sheets

(52) U.S. Cl.
CPC ..... *G02B 27/0149* (2013.01); *G02B 27/0179* (2013.01); *B60K 2370/1529* (2019.05); *B60K 2370/166* (2019.05); *B60K 2370/167* (2019.05); *B60K 2370/177* (2019.05); *B60K 2370/178* (2019.05); *B60K 2370/23* (2019.05); *G02B 2027/0154* (2013.01); *G02B 2027/0181* (2013.01); *G09G 2340/0464* (2013.01); *G09G 2340/12* (2013.01); *G09G 2380/10* (2013.01)

(56) References Cited

U.S. PATENT DOCUMENTS

| | | | |
|---|---|---|---|
| 2017/0153457 A1* | 6/2017 | Kunze | H04N 13/322 |
| 2017/0192234 A1* | 7/2017 | Lai | G02B 27/0101 |
| 2019/0149781 A1* | 5/2019 | Yata | H04N 9/3155 |
| | | | 348/748 |
| 2019/0265582 A1* | 8/2019 | Sakai | B60K 35/00 |

* cited by examiner

HEAD-UP DISPLAY DEVICE USED IN AUGMENTED REALITY

This application claims the benefit of People's Republic of China application Serial No. 201910919997.3, filed Sep. 26, 2019, the subject matter of which is incorporated herein by reference.

BACKGROUND OF THE INVENTION

Field of the Invention

The invention relates in general to a head-up display device, and more particularly to a head-up display device used in augmented reality (AR).

Description of the Related Art

To increase driving safety, a head-up display is provided. The head-up display enables the driver to view relevant driving information, instrument information or electronic map on the windscreen without having to move their driving vision. Besides, based on actual road conditions, the head-up display can further display the road sign information, the GPS information or the warning and detection information for vehicles ahead on the windscreen for drivers' reference.

Moreover, through image information projected to the windscreen by the head-up display and the features of visual image, the image information and the reality scene can be combined to achieve an effect of augmented reality (AR). Since drivers of different heights view the image information from different angles, the position of the image information viewed by a tall driver will be different from that viewed by a short driver. Therefore, the image information and the reality scene cannot be combined to achieve the effect of augmented reality.

SUMMARY OF THE INVENTION

According to one embodiment of the present invention, a head-up display device used in augmented reality is provided. The head-up display device includes a set of reflectors, a first optical module and a reflector adjustment mechanism. The set of reflectors includes at least one moveable reflector. The first optical module is configured to project a first image to at least one moveable reflector and further project the first image to a target position through the set of reflectors. The reflector adjustment mechanism is configured to adjust the position of at least one moveable reflector to change the height of the target position.

According to another embodiment of the present invention, a head-up display device used in augmented reality is provided. The head-up display device includes a set of reflectors, a first optical module, a second optical module and a reflector adjustment mechanism. The set of reflectors includes a first reflector and a second reflector, wherein the first reflector and the second reflector are disposed oppositely, the first reflector is moveable, and the second reflector is not moveable. The first optical module is configured to project a first image to the first reflector, which further reflects the first image to the second reflector for projecting the first image to a first target position. The second optical module is configured to project a second image to the second reflector for projecting the second image to a second target position. The reflector adjustment mechanism is configured to adjust the position of the first reflector to change the height of the first target position.

The above and other aspects of the invention will become better understood regarding the following detailed description of the preferred but non-limiting embodiment(s). The following description is made with reference to the accompanying drawings.

DETAILED DESCRIPTION OF THE INVENTION

Detailed descriptions of the invention are disclosed below with several embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the present invention, a head-up display device used in augmented reality is provided. The head-up display device adjusts the position in the reality to which an image is projected according to the eye position to achieve the effect of combining the image with the reality scene.

Figure 5A:
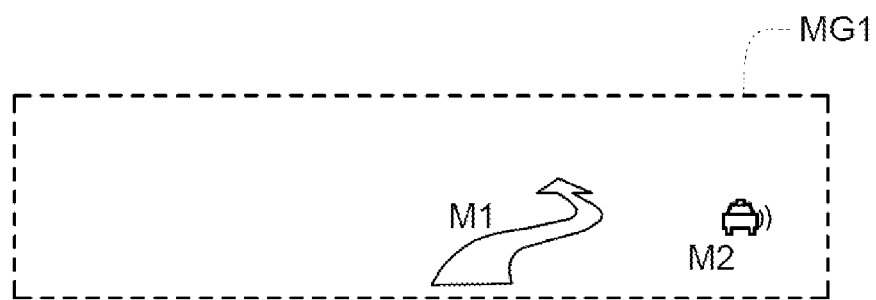
FIG. 5A and FIG. 5B respectively are schematic diagrams of a first image and a second image according to an embodiment of the present invention.
Figure 5B:
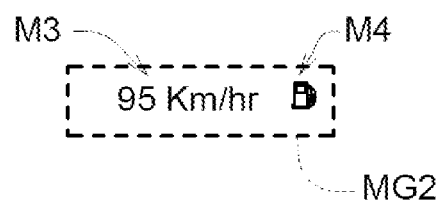

Referring to FIG. 5A and FIG. 5B, a first image MG1 and a second image MG2 according to an embodiment of the present invention are respectively shown. The picture information of the first image MG1 contains navigation information M1 and warning information M2 for vehicle ahead. The picture information of the second image MG2 contains a driving information M3 and an instrument information M4. In an embodiment of the present invention, the first image MG1 combines with the reality scene. The picture information M1 and M2 of the first image MG1 contains information such as road sign information, navigation information, and warning and detection information for vehicle ahead. The second image MG2 is configured to display other information. The picture information M3 and M4 of the second image MG2 contain information such as driving information, instrument information, and electronic map.

Figure 5C:
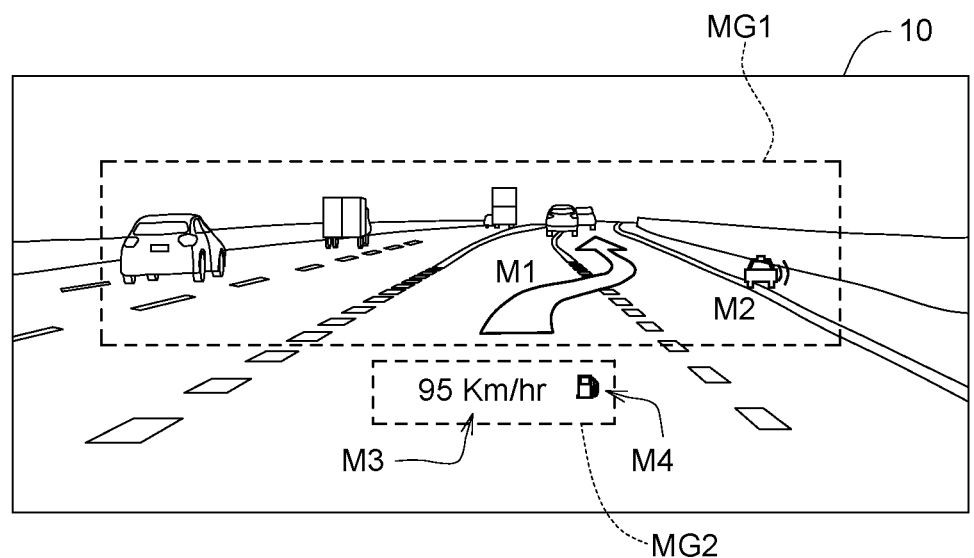
FIG. 5C is a schematic diagram of the first image and the second image projected on the windscreen and combined with a reality scene according to an embodiment of the present invention.

Referring to FIG. 5C, a schematic diagram of the first image MG1 and the second image MG2 being projected on the windscreen 10 and combined with a reality scene according to an embodiment of the present invention is shown. As indicated in FIG. 5C, when the first image MG1 is projected to a target position on the windscreen 10, the picture information of the first image MG1 (such as the navigation information M1 and the warning information M2 for vehicle ahead) can be combined with the reality scene (such as vehicles, passengers, traffic lights, and road dividers) to realize an effect of augmented reality. The second image MG2 can be projected to another target position on the windscreen 10, such as the peripheral position on the windscreen 10, without affecting the sight of driving.

Figure 1:
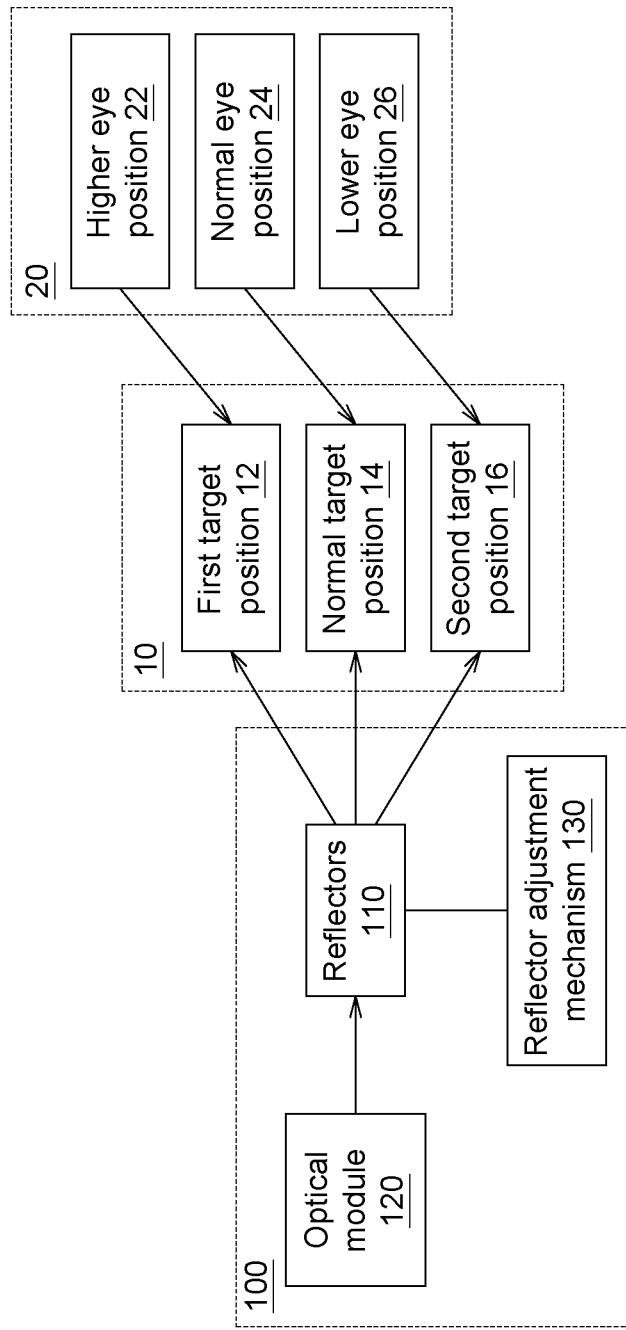
FIG. 1 is a schematic diagram of a head-up display device used in augmented reality according to an embodiment of the present invention.

Referring to FIG. 1, a schematic diagram of a head-up display device 100 used in augmented reality according to an embodiment of the present invention is shown. The head-up display device 100 includes a set of reflectors 110, an optical module 120 and a reflector adjustment mechanism 130.

The optical module 120 is configured to project the first image MG1 to the set of reflectors 110. The optical module 120 includes at least one light source. The light source can output a white light or lights of three primary colors, namely a red light, a green light and a blue light. The outputted light can be split or combined by an optical element, such as a color wheel, a beam splitter or a light combining prism. Then, the light can be imaged by a projection lens. For example, the first image MG1 is projected to the set of reflectors 110. The optical module 120 can be realized by such as a digital light processing (DLP) module or a 3-pieces liquid crystal display (3LCD) module. The optical module 120 can also be a picture generation unit (PGU) or other display module.

The set of reflectors 110 reflects the first image MG1 to a target position on the windscreen 10. Then, the first image MG1 is reflected to the eyes of the driver 20 through the windscreen 10 to generate a virtual image of the first image MG1. Refer to FIG. 1. The target position is such as a first target position 12, a normal target position 14 or a second target position 16. The normal target position 14 is located between the first target position 12 and the second target position 16, and corresponds to a normal height of the eye position 24, that is, the height of the eye position of the driver 20 with an average height. Besides, the height of the first target position 12 on the windscreen 10 is greater than the height of the normal target position 14, and the first target position 12 corresponds to a higher eye position 22, that is, the eye position of a taller driver 20. Additionally, the height of the second target position 16 on the windscreen 10 is lower than the height of the normal target position 14, and the second target position 16 corresponds to a lower eye position 26, that is, the eye position of a shorter driver 20.

In an embodiment of the present invention, the target position on the windscreen 10 to which the first image MG1 is projected is relevant with the height of the eye position of the driver 20. By adjusting the set of reflectors 110, the head-up display device 100 of the present embodiment can project the first image MG1 to different target positions corresponding to different heights of the eye position of the driver 20.

Figure 2A:
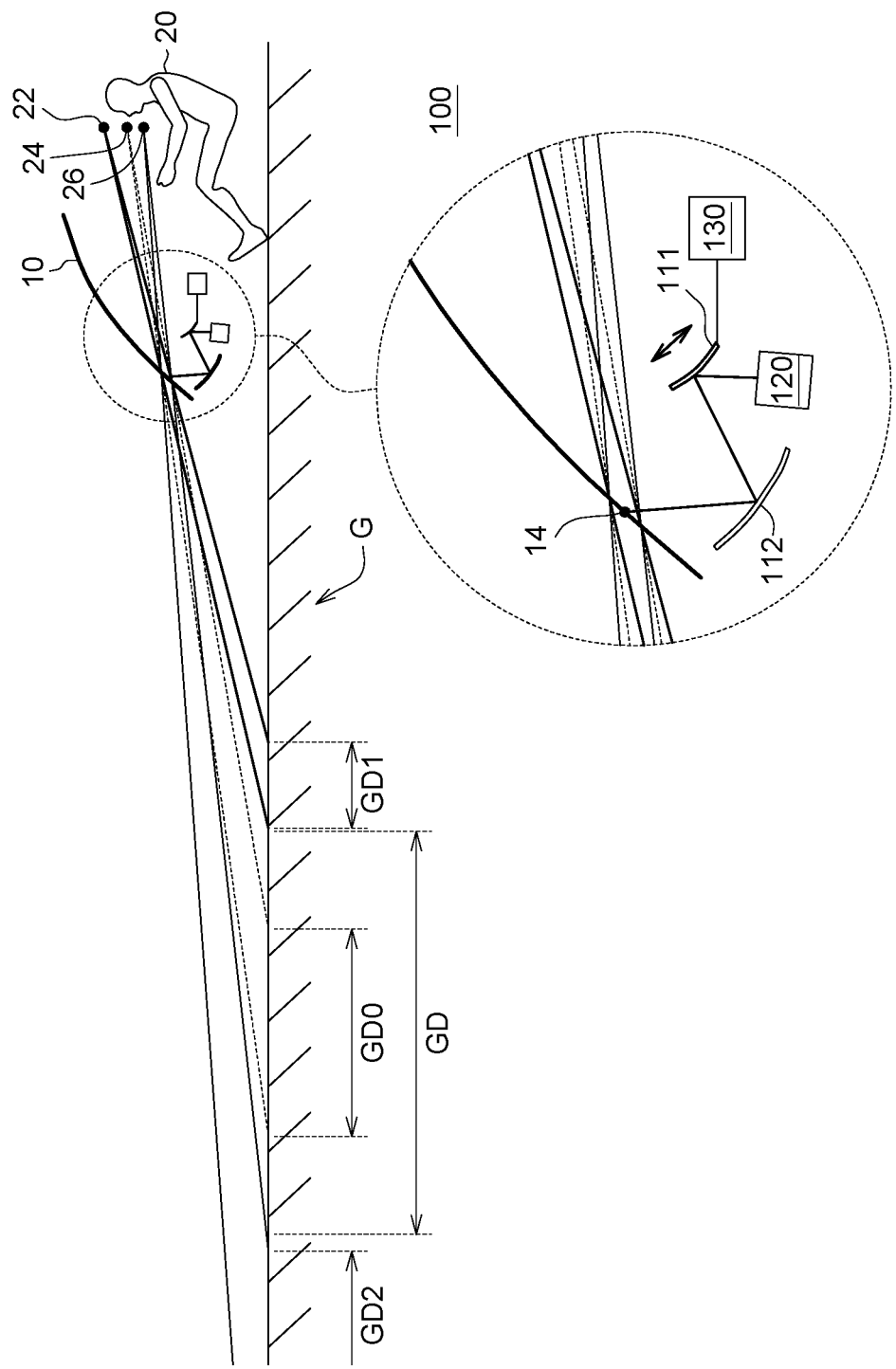
FIG. 2A is a schematic diagram of optical paths on which the image projected to a normal target position in response to the heights of the eye positions.

Generally speaking, if the virtual image generated when the first image MG1 is reflected to the eyes of the driver 20 through the windscreen 10 can be projected to a predetermined reality combining region GD, then the first image MG1 can be combined with the reality scene to achieve an combination effect of the image and the reality scene. Referring to FIG. 2A, a schematic diagram of optical paths on which the image projected to a normal target position 14 in response to the heights of the eye positions is viewed from a normal eye position 24, the virtual image of the first image MG1 can be projected to a normal ground region GD0 on the ground G. If the normal ground region GD0 falls with the reality combining region GD, the projection position of the image can match the reality scene. However, when the first image MG1 projected to normal target position 14 is viewed from a higher eye position 22, the first image MG1 will be projected to a first ground region GD1 closer to the driver 20 than the normal ground region GD0. When the first image MG1 projected to normal target position 14 is viewed from a lower eye position 26, the first image MG1 will be projected to a second ground region GD2 farther away from the driver 20 than the normal ground region GD0 or even may be projected to the position over the horizontal line. When the position of the virtual image of the first image MG1 is projected to the reality scene through the sight line of human eyes but is outside a predetermined reality combining region GD, the first image MG1 cannot be correctly combined with the reality scene to realize the effect of augmented reality.

To assure that the image viewed by the driver 20 can be projected to the reality combining region GD to be combined with the reality scene regardless of the eye position of the driver 20 being high or low, the reflector adjustment mechanism 130 of the present embodiment is configured to adjust the set of reflectors 110 for adjusting the target position to which the first image MG1 is projected (such as normal target position 14, the first target position 12 or the second target position 16) to match the height requirement of the eye position of the driver 20 and to cause the first image MG1 viewed by the driver to be projected to the reality combining region GD.

Figure 2B:
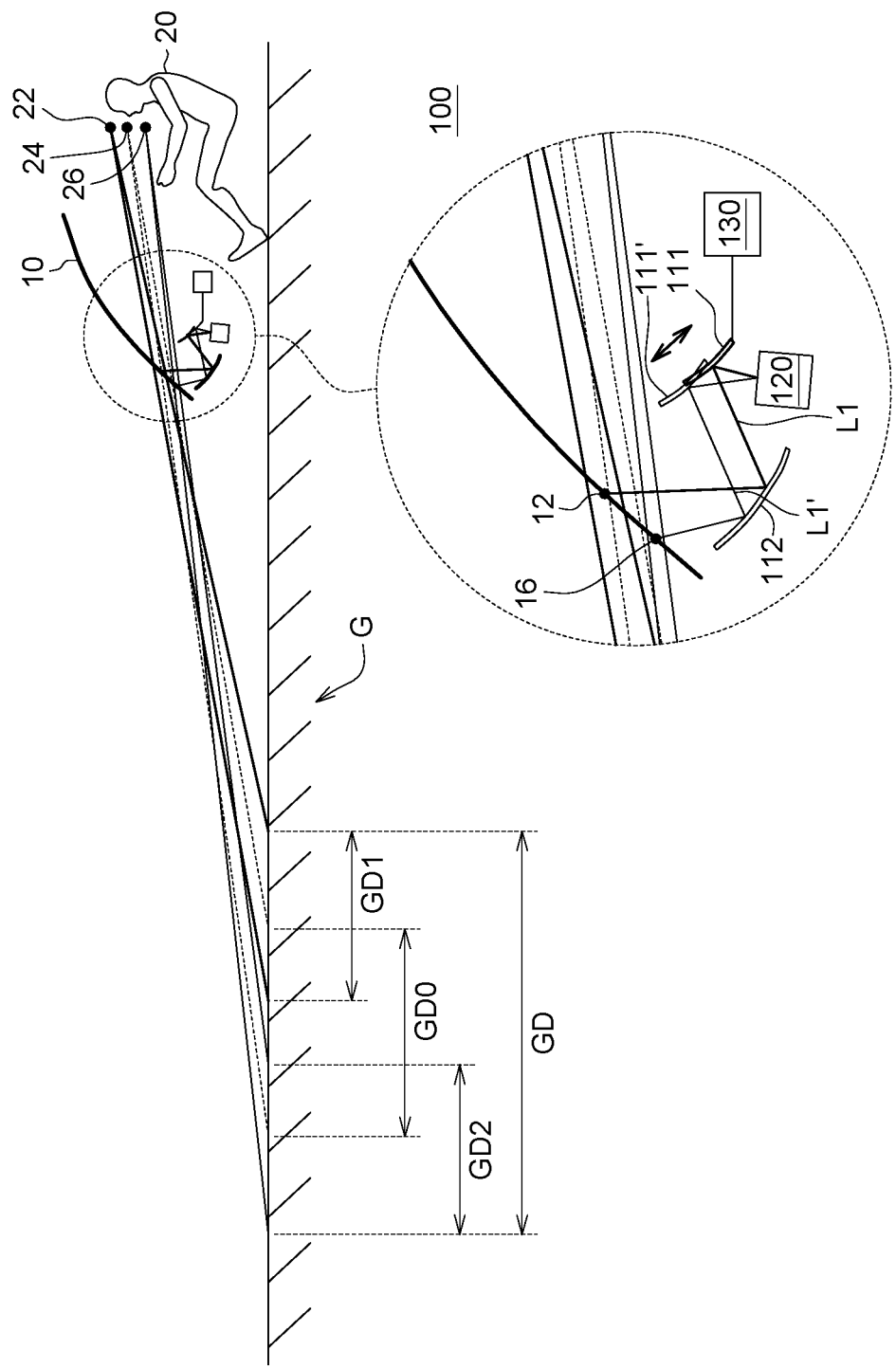
FIG. 2B is a schematic diagram of corresponding target positions to which the image is projected by a head-up display device in response to the heights of the eye positions according to an embodiment of the present invention.

Referring to FIG. 2B, a schematic diagram of corresponding target positions to which the image is projected by a head-up display device in response to the heights of the eye positions according to an embodiment of the present invention is shown. As indicated in FIG. 2B, the set of reflectors 110 includes a first reflector 111 and a second reflector 112. The first reflector 111 and the second reflector 112 are disposed oppositely, and at least one of the first reflector 111 and the second reflector 112 is moveable. The first image MG1 can be projected to the first reflector 111 by the optical module 120, and is further reflected to the second reflector 112 from the first reflector 111. Then, the second reflector 112 projects the first image MG1 on the windscreen 10.

In an embodiment, the first reflector 111 and the second reflector 112 can be curved surface mirrors or aspheric mirrors. As indicated in FIG. 2B, the first reflector 111 can be a convex mirror, and the second reflector 112 can be a concave mirror. The first reflector 111 is moveable, and the second reflector 112 is not moveable. The reflector adjustment mechanism 130 can be realized by a knob or a lever configured to rotate or translate the first reflector 111 to change the position from which the first reflector 111 reflects the image to the second reflector 112 to change the height from which the second reflector 112 projects the image to the target position on the windscreen 10. In an embodiment, the reflector adjustment mechanism 130 is configured to translate the first reflector 111. The reflector adjustment mechanism 130 can drive the first reflector 111 to translate along a plane in a direction close to or away from the windscreen 10.

As indicated in FIG. 2B, when the first reflector 111 is at the first position, that is, a position away from the windscreen 10, the first image MG1 is projected to the first target position 12 of the windscreen 10 by the optical module 120 along an optical path L1. When the optical module 120 is moved to the second position of the first reflector 111', that is, a position closer to the windscreen 10, the first image MG1 is projected to the second target position 16 on the windscreen 10 by the optical module 120 along the optical path L1'. The height of the second target position 16 on the windscreen 10 is lower than the height of the first target position 12 on the windscreen 10.

Figure 3A:
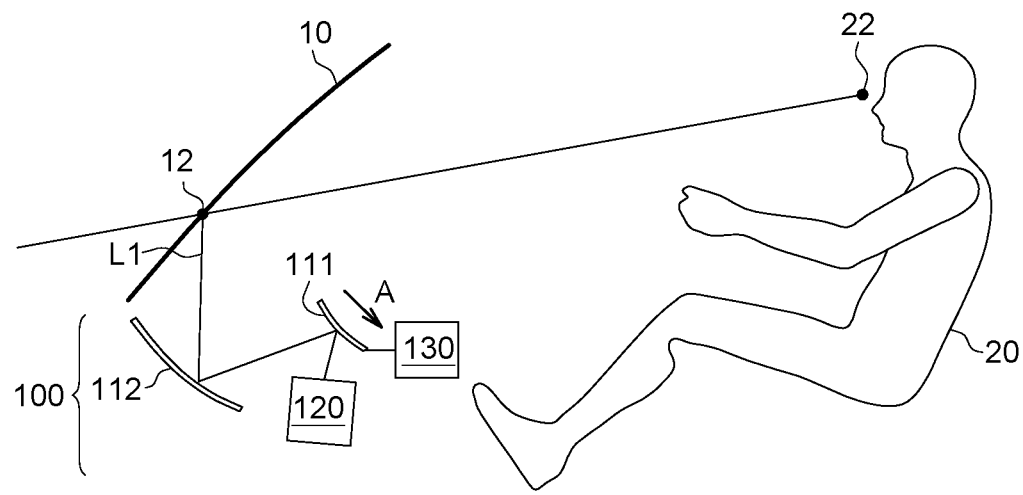
FIG. 3A and FIG. 3B respectively are schematic diagrams of the optical path of an image when the first reflector of the head-up display device of FIG. 2 is at different positions.
Figure 3B:
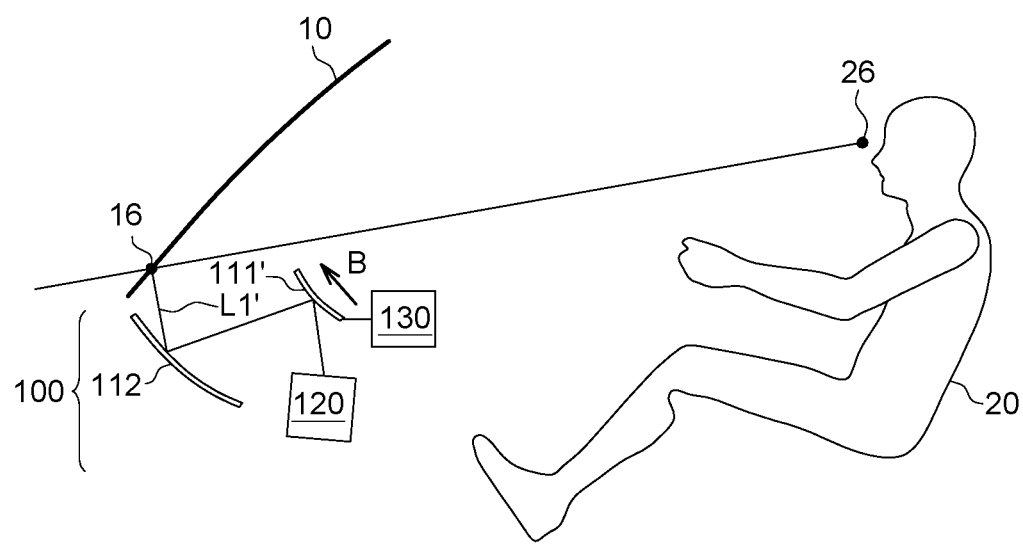

Referring to FIG. 3A to FIG. 3B, schematic diagrams of the optical path of an image when the first reflector 111 of the head-up display device 100 of FIG. 2 is at different positions are respectively shown. As indicated in FIG. 3A, when the first reflector 111 is translated away from the windscreen 10 in a direction A, the optical path L1 of the first image MG1 is reflected by the set of reflectors 110 to reach a higher first target position 12 to match the height requirement of the eye position of a taller driver 20. As indicated in FIG. 3B, when the first reflector 111' is moved towards the windscreen 10 in a direction B, the optical path L1' of the first image MG1 is reflected by the set of reflectors 110 to reach a lower second target position 16 to match the height requirement of the eye position of a shorter driver 20.

In another embodiment, the first reflector 111 is not moveable, but the second reflector is 112 is moveable. Thus, the first image MG1 is firstly projected to the un-moveable first reflector 111 by the optical module 120, and then is further reflected to the moveable second reflector 112 from the un-moveable first reflector 111. Then, the second reflector 112 projects the first image MG1 on the windscreen 10. In the present embodiment, through the rotation or translation of the moveable second reflector 112, the target position on the windscreen 10 to which the first image MG1 is projected can be changed.

In an alternate embodiment, both the first reflector 111 and the second reflector 112 are moveable, that is, the reflector adjustment mechanism 130 can adjust the first reflector 111 and the second reflector 112 simultaneously or individually to cause the first reflector 111 and the second reflector 112 to rotate or translate. When both the first reflector 111 and the second reflector 112 are moveable, the first reflector 111 and the second reflector 112 can be translated in the same direction, rotated in the same direction, translated in opposite directions or rotated in opposite directions, and the present invention is not limited thereto. In the present embodiment, the first reflector 111 and/or the second reflector 112 are translated, such that the height of the target position on the first image MG1 can be fine-tuned and the range of displacement of the target position will not be too large which may otherwise occur when the first reflector 111 and/or the second reflector 112 are rotated.

In the present embodiment, the rotation angle or the translation distance of the set of reflectors 110 is relevant with the height of the eye position from which the first image MG1 is viewed by the user. The user can adjust the set of reflectors 110 according to actual height of the eye position to achieve a better combination effect of the reality scene and the virtual image.

Figure 4:
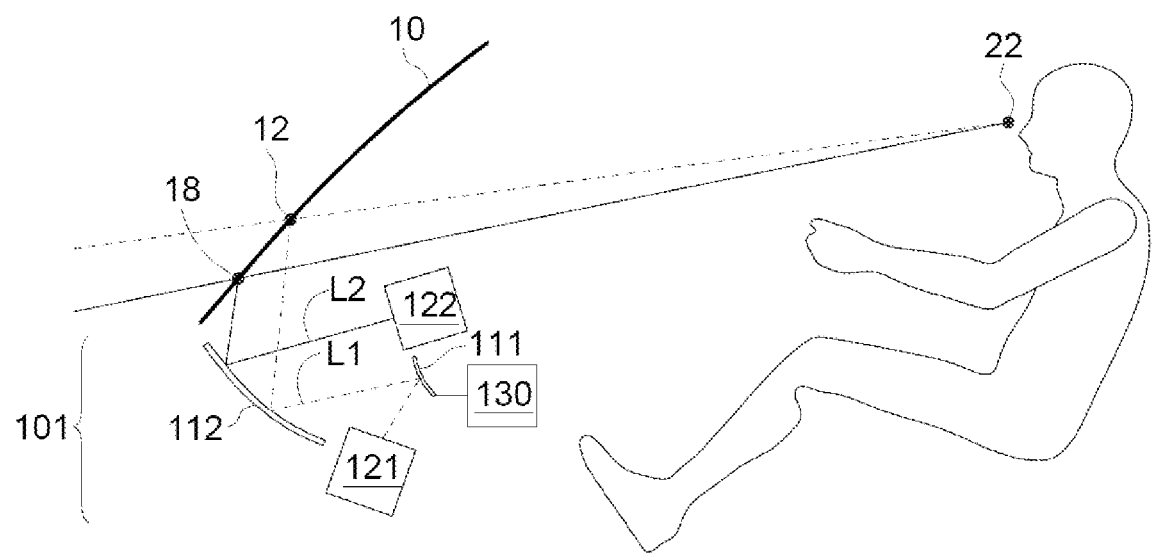
FIG. 4 is a schematic diagram of an optical path of an image projected by a head-up display device according to another embodiment of the present invention.

Referring to FIG. 4, a schematic diagram of an optical path of an image projected by a head-up display device with dual optical modules according to another embodiment of the present invention is shown. The head-up display device 101 of the present embodiment is similar with the head-up display device 100 of the above embodiment except that the head-up display device 101 of the present embodiment includes a first optical module 121 and a second optical module 122. The first optical module 121 is the same as the optical module 120 disclosed above, the second optical module 122 is configured to project the second image MG2 to the second reflector 112 and to cause the second image MG2 to be projected to a third target position 18 on the windscreen 10 through the second reflector 112, wherein the height of the third target position 18 is lower than that of the second target position 16. As indicated in FIG. 5C, the horizontal height of the second image MG2 on the windscreen 10 is lower than the horizontal height of the first image MG1 on the windscreen 10, and the first image MG1 and the second image MG2 are formed from two different optical paths L1 and L2. That is, the second image MG2 is not projected on the first reflector 111. Besides, in the present embodiment, the first reflector 111 is moveable, but the second reflector 112 is not moveable.

In the present embodiment, since the second image MG2 is directly projected on un-moveable second reflector 112, the height of the target position to which the second image MG2 is projected on the windscreen 10 will not change. However, in the present embodiment, the second optical module 122 can adjust the position at which the picture information of the second image MG2 is displayed in the display range of the second image MG2 in response to different heights of the eye positions.

Figure 5D:
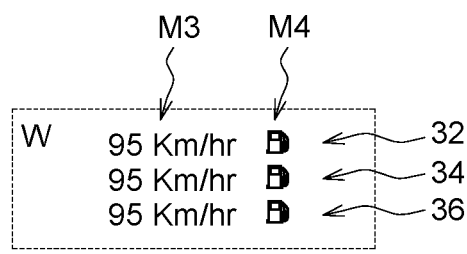
FIG. 5D is a schematic diagram of the picture information of the second image at different positions in the display range of the second image.

As indicated in FIG. 5D, a schematic diagram of the picture information M3 and M4 of the second image MG2 at different positions in the display range W of the second image MG2 is shown. When the picture information M3 and M4 are located at a higher position 32 in the display range W, the picture information M3 and M4 correspond to the height of the eye position 22 of a taller driver 20. When picture information M3 and M4 are located at a normal position 34 in the display range W, the picture information M3 and M4 correspond to the height of the eye position 22 of a viewer with ordinary height. When the picture information M3 and M4 are located at a lower position 36 in the display range W, the picture information M3 and M4 position correspond to the height of the eye position 26 of a shorter driver 20. Therefore, the adjusted second image MG2 can match the height of the eye position of the driver 20 with different heights.

In another embodiment, when the second reflector 112 is moveable, the height of the target position of the second image MG2 can be changed through the adjustment of the second reflector 112.

The first optical module 121 and the second optical module 122 can be realized by such as a digital light processing (DLP) module, a 3-LCD (liquid crystal display) module, a picture generation unit or other display module as disclosed in above embodiments, and are not repeated here.

The dual optical modules adopted in the present embodiment can generate a first image MG1 and a second image MG2 with different resolution levels. As indicated in FIG. 5C, the first image MG1, which is mainly used to display the road sign information, the navigation information or the warning and detection information for vehicle ahead, is represented by a larger picture, and therefore requires a lower level of resolution. The second image MG2, which is mainly used to display the driving information, the instrument information or the electronic map, is represented by texts or a finer picture, and therefore requires a higher level of resolution. By adopting the design of dual optical modules, the head-up display device 101 of the present embodiment can resolve the problem of the conventional optical path system being unable to generate dual images with different levels of resolution. Also, the dual optical modules can project the images to different projection distances for different purposes. For example, the first image MG1 can be projected to a farther distance to be combined with the reality scene to realize an augmented reality, and the second image MG2 can be projected to a shorter distance to replace the instrument information.

Additionally, by adopting the design of dual optical modules, the head-up display device 101 of the present embodiment can select different magnification rates according to the displayed information. Besides, the displayed information and the magnification rate of the first image MG1 and the second image MG2 are relevant with the information of the reality scene viewed by the user. As indicated in FIG. 5C, the first image MG1, such as a wide frame image with a large view angle and a long distance of optical path, is located at the top of the windscreen 10 for displaying a larger image such as a road sign. Therefore, the magnification rate can be increased, and the first image MG1 can have a wider frame and becomes more suitable for displaying a larger scope of driving information for the user's convenience of recognition. The second image MG2, such as a narrow frame image with a small view angle and a short distance of optical path, is located at the bottom of the windscreen 10 for displaying a smaller and finer image. Therefore, the magnification rate can be reduced, and the second image MG2 has a narrower frame and becomes clearer. By adopting the design of dual optical modules, the head-up display device 101 of the present embodiment can resolve the problem of the conventional optical path system being unable to generate dual images with different magnification rates.

As disclosed above, the head-up display device of the above embodiments of the present invention can display the first image MG1 using an optical path system, and can further adjust the target position of the first image MG1 according to the height of the user and the height of the eye position, such that when relevant information of the first image MG1 is projected to a target position, the projected image can be combined with the reality scene to realize an augmented reality. Moreover, the head-up display device can display the first image MG1 and the second image MG2 using a dual optical path system to obtain the first image MG1 and the second image MG2 with different levels of resolution or different magnification rates according to the optical systems, hence resolving the problem of the conventional optical system being unable to generate dual images with different levels of resolution or different magnification rates.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation to encompass all such modifications and similar arrangements and procedures.

What is claimed is:

1. A head-up display device used in augmented reality which directs images to a windscreen, the head-up display device comprising:
   a set of reflectors, comprising a first reflector and a second reflector disposed under the windscreen, wherein the first reflector and the second reflector are disposed oppositely, the first reflector is moveable, and the second reflector is not moveable;
   a first optical module configured to project a first image to the first reflector, which further reflects the first image to the second reflector and the windscreen for projecting the first image to a first target position of the windscreen;
   a second optical module configured to project a second image to the second reflector and the windscreen for projecting the second image to a second target position of the windscreen, wherein the second image is not projecting to the first reflector; and
   a reflector adjustment mechanism configured to adjust a position of the first reflector to change a height of the first target position;
   wherein the first target position is higher than the second target position.

2. The head-up display device according to claim 1, wherein the second image has a resolution higher than a resolution of the first image.

3. The head-up display device according to claim 1, wherein the first image has a magnification rate greater than a magnification rate of the second image.

4. The head-up display device according to claim 1, wherein the first reflector is moveable along a direction toward or backward to the windscreen.

5. A head-up display device used in augmented reality which directs images to a windscreen, the head-up display device comprising:
   a set of reflectors, comprising a first reflector and a second reflector different from the windscreen, wherein the second reflector is adjacent to the windscreen, the first reflector and the second reflector are disposed oppositely, the first reflector is moveable, and the second reflector is not moveable;
   a first optical module configured to project a first image to the first reflector, which further reflects the first image to the second reflector and the windscreen in sequence for projecting the first image to a first target position of the windscreen;
   a second optical module configured to project a second image directly to the second reflector and the windscreen in sequence for projecting the second image to a second target position of the windscreen; and
   a reflector adjustment mechanism configured to adjust a position of the first reflector to change a height of the first target position;
   wherein the first target position is higher than the second target position.

6. The head-up display device according to claim 5, wherein the second image has a resolution higher than a resolution of the first image.

7. The head-up display device according to claim 5, wherein the first image has a magnification rate greater than a magnification rate of the second image.

8. The head-up display device according to claim 5, wherein the first reflector is moveable along a direction toward or backward to the windscreen.

9. The head-up display device according to claim 5, wherein the second image is not projecting to the first reflector.

10. The head-up display device according to claim 5, wherein the second reflector is single.

* * * * *